Aug. 27, 1929.  L. G. SIMPSON  1,725,833
POWER TRANSMISSION MECHANISM
Original Filed March 7, 1927   3 Sheets-Sheet 3
Fig. 3
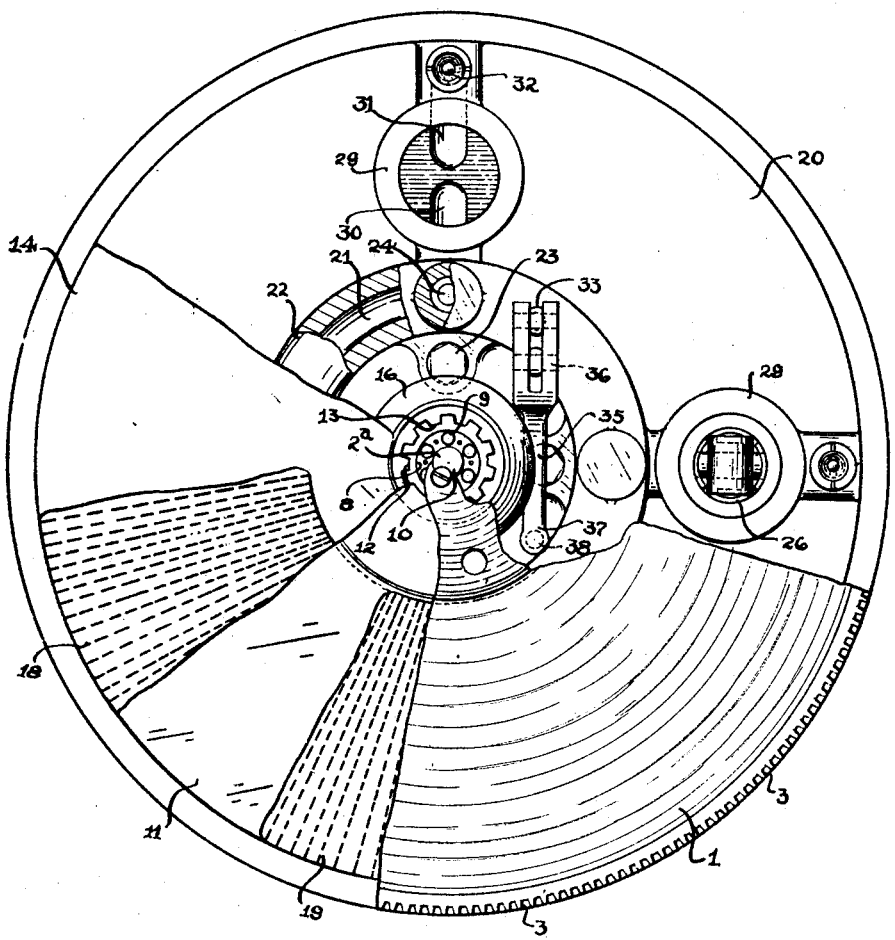
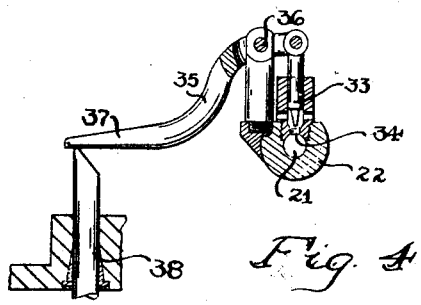
Fig. 4
INVENTOR
Leon G. Simpson
BY
H. H. Simms
his ATTORNEY Patented Aug. 27, 1929.

1,725,833

UNITED STATES PATENT OFFICE.

LEON G. SIMPSON, OF ROCHESTER, NEW YORK, ASSIGNOR TO L. G. SIMPSON CORPORATION, OF ROCHESTER, NEW YORK, A CORPORATION OF NEW YORK.

POWER-TRANSMISSION MECHANISM.

Application filed March 7, 1927, Serial No. 173,242. Renewed December 31, 1928.

The present invention relates to power transmission mechanism and more particularly to the type in which a fluid is employed for controlling the movement between a driving and a driven element. An object of this invention is to provide a construction which will effectively establish a direct drive between the driving and the driven element without any lost motion and which will at the same time permit freedom of action when the transmission mechanism is adjusted to non-driving or neutral position.

To these and other ends, the invention consists of certain parts and combinations of parts, all of which will be hereinafter described; the novel features being pointed out in the appended claims.

In the drawings:

Fig. 3 is a side view with different parts broken away to illustrate the different interior parts of the mechanism; and Fig. 4 is a detail view showing the manner in which the flow from the high pressure compartment is controlled;

Figure 1:
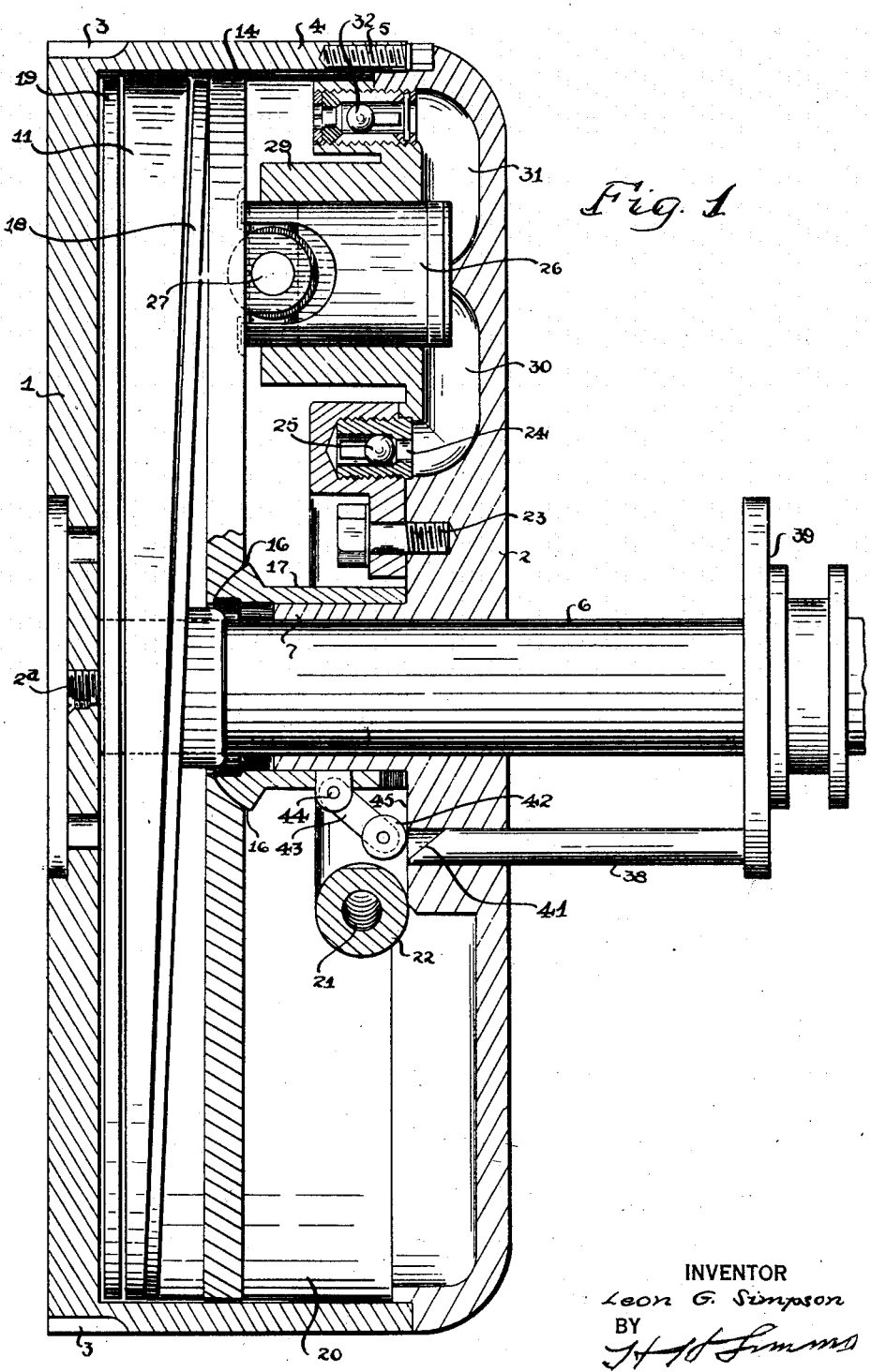
Fig. 1 is an axial section through the mechanism when adjusted for non-driving or neutral position.

Referring more particularly to the illustrated embodiment of the invention there is employed a driving member and a driven member. In this instance, the driving member has a fluid container casing formed thereon and, to this end, the driving member comprises two parts or casing forming members 1 and 2. The casing forming member 1 has peripheral teeth 3 through which the driving member is turned from the starter. The casing member also has the engine shaft bolted thereto at 2ª. This casing forming member also has a projecting annular flange 4 to which the casing forming member 2 is secured by bolts 5. The driven member comprises a shaft 6 extending through the casing forming member 2 and journalled in an internal sleeve 7 thereon. The end of this driven member is formed with a pocket 8 which receives roller bearings 9 turning on a bearing 10 projected centrally from the member 1 of the driving member and acting to hold the driven member 6 in centered relation to the driving member at the inner or free end of the driven member.

Mounted on the driven member 6 within the casing of the driving member is a disk or friction clutch member 11. This disk is wedge shape in cross section and is rigidly held against turning on the driven shaft 6 although having a slight axial movement on said shaft. This mounting of the disk is obtained by providing the shaft with a plurality of longitudinally extending grooves 12 in which is received axially extending ribs 13 on the hub of the wedge shaped member 11, the grooves being longer than the ribs 12 and permitting the axial movement of the shaft carried disk 11 on the shaft 6.

The disk 11 operates between two other clutching elements or surfaces one of which is formed by the inner face of the casing member 1 and the other of which, indicated at 14, is also mounted to turn with the driving element. This clutching member 14 is a flat disk of uniform thickness and it is mounted to rock at its center. To this end, it is provided with a curved or rocking bearing surface 15 about its central opening, this rocking or curved bearing engaging a rocking or curved bearing 16 formed on an axially movable sleeve 17 which is mounted on the sleeve 7 forming a bearing for the shaft 6. Between the wedge shaped friction member 11 and the friction clutch member 14, and also between the friction member 11 and the adjacent friction surface on the driving member are arranged loose friction disks 18 and 19 respectively. These loose friction disks 18 and 19 are formed of asbestos or other suitable frictional material having a high coefficient of friction, the material being such that it will not be affected by heat created by friction.

The casing or driven member 2 has a large chamber 20 forming what might be termed a low pressure fluid compartment. There is also a high pressure fluid compartment preferably formed by an annular chamber 21 in an annular casting 22 bolted at 23 to the inner face of the casing member 2 and provided with a plurality of intake ports 24 controlled by ball valves 25 holding any fluid forced into the chamber 21 against return through the ports 24. Also mounted, in this instance, on the casing member 2 are a plurality of pistons 26 each of which has a universal joint connection with the rocking clutch member 14. These pistons each operate in one of the plurality of cylinders 29 formed in the casing member 2 and connected by ports 30 to one of the intakes 24 of the high pressure fluid compartment 21. Each cylinder connects by a port 31 with an intake valve 32, this intake valve being located in close proximity to the inner face of the outermost wall 4 of the low pressure fluid compartment 20. The purpose of arranging the valves in this position is to permit the intake valves to have a supply of liquid to feed to the high pressure fluid compartment, even though the low pressure compartment may not be filled, for it will be apparent that, upon the rotation of the driving casing, the fluid therein will be thrown outwardly by said centrifugal force against the wall 4 and even though there be no fluid or liquid at the center of the casing, the valves 32 will draw upon sufficient liquid to maintain the high pressure fluid compartment 21 filled.

The flow from the high pressure fluid compartment is controlled by a valve 33 which controls a port 34 in the high pressure fluid compartment 21 and is operated by a lever 35 pivoted at 36 and having an arm 37 arranged to be engaged by a plunger 38 guided in the casing member 2 and connected to a sleeve 39 which is slidable on the shaft 6. A spring 40 acts on the sleeve 39 and moves the plunger 38 to move the lever in a direction to close the valve 33. Any suitable mechanism may be connected to the sleeve 39 for the purpose of moving said sleeve against the spring in order to make the valve 33 open under the pressure in the high pressure chamber or compartment 21.

Figure 2:
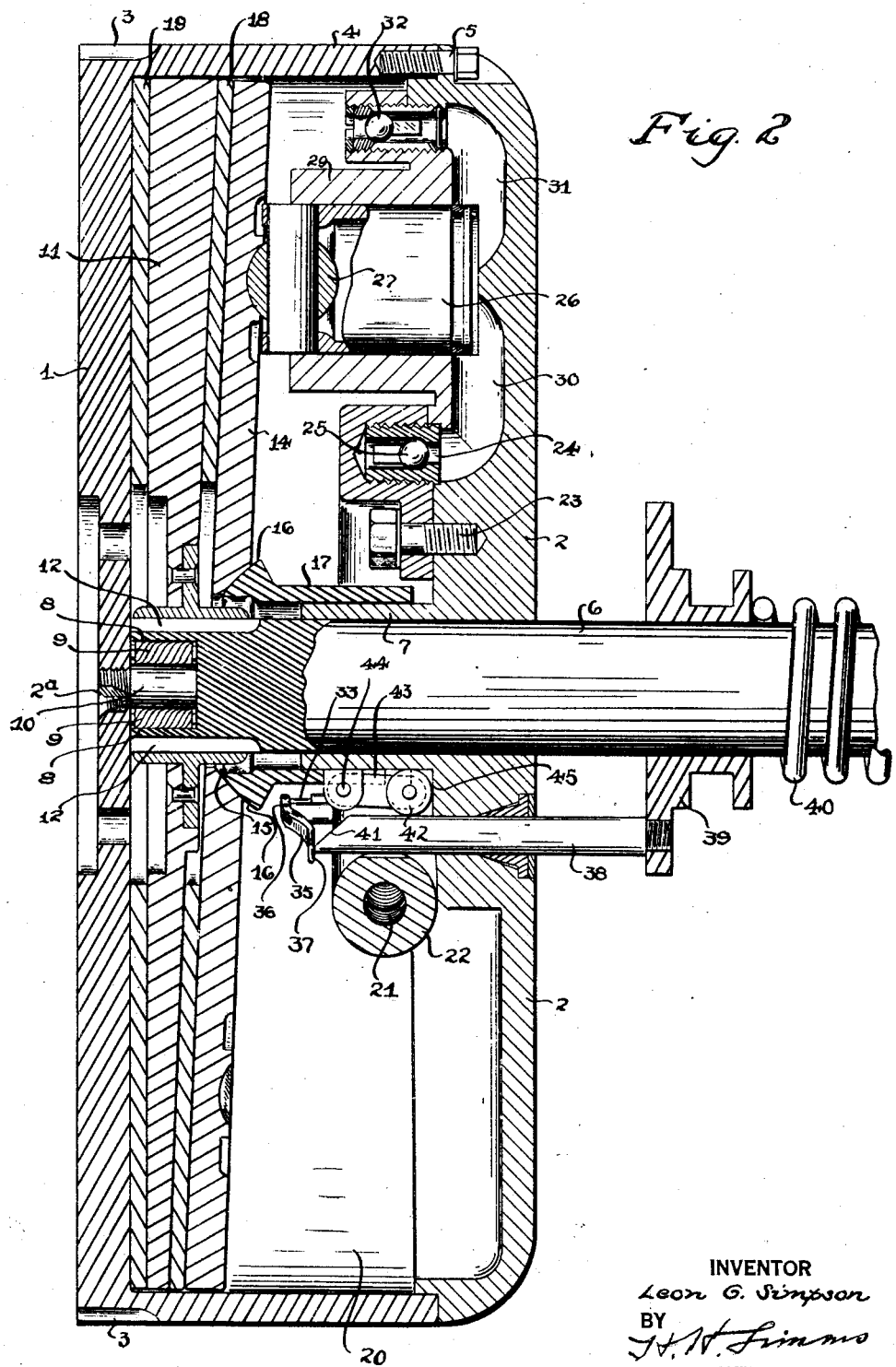
Fig. 2 is a similar section with the parts adjusted for direct drive.

The plunger 38 also acts to control the movement of the sleeve 17 which supports the bearing 16 for the frictional clutch member 14 and to this end, the extreme end 41 of the plunger 38 is beveled to cooperate with the roller 42 on a link 43 which is pivoted at 44 to the sleeve 17. After the beveled end 41 of the plunger 38 engages the roller 42 the latter is forced in contact with the wall 45 as shown in Fig. 2, thus holding the bearing sleeve 17 in bearing relation to the clutch member 14 as illustrated in Fig. 2. When the plunger 38 is withdrawn the roller 42 swings outwardly as shown in Fig. 1 and the sleeve 17 is then permitted to move in order that the clutch member 14 may occupy the position shown in Fig. 1 under the action of the clutch member 11.

The operation of this invention may be understood from the foregoing description, but it may be summarized as follows: Assume that the parts occupy the neutral or non-driving position shown in Fig. 1 and it is desired to establish a direct drive as shown in Fig. 2, after carrying the mechanism through the different steps or speeds necessary to bring it up to the direct drive position. The sleeve 39 is permitted to move gradually on the shaft 6 under the action of the spring 40. This first effects the axial movement of the sleeve 17 shifting the rocking bearing 16 toward the wedge shaped clutch member 11. Then the plunger 38 engages the valve controlling member 35 and moves the valve 33 slowly to close the discharge opening 34. Immediately that the clutch member 14 is moved toward the clutch member 11, the clutch member 14 begins to rock on its bearing 16 and in rocking on the bearing moves the pistons or plungers 26 in their cylinders 29, thereby drawing fluid or liquid from the low pressure fluid compartment or chamber 20 and forcing it into the high pressure fluid compartment 21. With the gradual closing of the valve 33 and the consequent restriction of the flow from the high pressure fluid compartment 21, the movement of the pistons 26 becomes slower and, as a consequence, the rocking movement of the clutch member becomes slower until the valve member 33 completely cuts off the exhaust from the high pressure fluid compartment 21, at which time the movements of the pistons 26 are stopped and the rocking movement of the clutch member 14 is stopped so that the wedge shaped clutch member 11 is held between the clutch element 14 and the inner face of the casing part 1, this holding being assisted by the two friction disks 18 and 19 loosely mounted between the clutch elements. As a result the shaft 6 turns with the driving casing without any relative movement between them. The slowing down or stopping of the shaft 6 is effected by the movement of the sleeve 39 in the opposite direction which first relieves the pressure in the high pressure fluid compartment 21 so that the disk or clutch member 14 may rock on this bearing, thereafter the sleeve 17 shifts so that the clutch member 14 may occupy the position shown in Fig. 1 and the wedge shaped clutch member 11 will permit the casing 1 to turn relatively thereto and not produce any turning action in the shaft 6.

What I claim as my invention and desire to secure by Letters Patent is:

1. A power transmission mechanism comprising a driving member, a driven member, a wedge shaped friction clutch member secured to the driven member, and two clutching members between which the wedge shaped clutch member operates, both of said members being mounted to turn with the driving member, and one of said members being rigid with the driving member and the other of said members being mounted to rock on the driving member, and fluid controlled means for opposing the rocking movement of said rocking member.

2. A power transmission mechanism comprising a driving casing having a clutch face rigid therewith, a driven shaft turning in the casing, a wedge shaped friction clutch member secured to the driven shaft adjacent to the friction clutch face of the casing, a rocking member having a friction clutch face arranged on that side of the wedge shaped friction clutch member opposite that side on which the clutch face of the casing is arranged, and fluid controlled means for opposing the rocking movement of the rocking member.

3. A power transmission mechanism comprising a driving casing having therein a low pressure fluid compartment and a high pressure fluid compartment, a friction clutch face rigid with such casing, a rocking member having a clutch face turning with the casing, a shaft turning in the casing, a wedge shaped clutch member arrange to operate between the first two mentioned clutch faces and turning with the shaft, pistons opposing the movement of the rocking clutch member and arranged to force fluid from the low pressure fluid compartment to the high pressure fluid compartment and means for controlling the flow from the high pressure fluid compartment to the low pressure fluid compartment.

4. A power transmission mechanism comprising a driving casing having therein a low pressure fluid compartment and a high pressure fluid compartment, means providing communication between the low pressure fluid compartment and the high pressure fluid compartment, said means communicating with the low pressure fluid compartment adjacent the outside wall of the latter so that as the casing rotates the fluid will be thrown by centrifugal force toward the outside wall of the low pressure fluid compartment where it provides a constant supply to the communication leading to the high pressure fluid compartment, a driven member, a friction clutch member secured to the driven member to turn therewith, two friction clutch members mounted to turn with the casing, one of such clutch members being mounted to rock, pistons opposing the rocking movement of the rocking clutch member and arranged in the communication between the low pressure fluid compartment and the high pressure fluid compartment to draw fluid from the former and force it into the latter, and means controlling the flow from the high fluid pressure compartment to the low pressure fluid compartment.

5. A power transmission comprising a driving casing having therein a low pressure fluid compartment and a high pressure fluid compartment, means providing communication between the low pressure fluid compartment and the high pressure fluid compartment, two friction clutch members carried by the casing, one of said clutch members being mounted to rock, a wedge shaped clutch member mounted to turn with the driven member, pistons controlling the movement of the rocking clutch member and arranged in the communication between the low pressure fluid compartment and the high pressure fluid compartment, and means for controlling the flow of the fluid from the high pressure fluid compartment to the low pressure fluid compartment.

6. A power transmission mechanism comprising a driving member, a driven member, two clutching members mounted on the driving member, both of said members being mounted to turn with the driving member and one of said members being mounted to rock on the driving member, a clutch member on the driven member arranged between the two surfaces of the driving member, friction disks loosely mounted between the clutch member on the driven member and the clutch members on the driving member, and fluid controlled means for opposing the rocking movement of the rocking member on the driving member.

7. A power transmission mechanism comprising a driving member, a driven member, two clutching members on the driving member, a movable rocking bearing for one of said members, a friction clutch member secured to the driven member to turn therewith and operating between the two friction members, and fluid controlled means opposing the rocking movement of the rocking member.

8. A power transmission mechanism comprising a casing, a shaft turning in the casing, a friction clutch member secured to the shaft, two clutch members arranged on opposite sides of the clutch member and mounted to turn with the casing, a sleeve surrounding the shaft and having a rocking bearing on which one of the two last named clutching members is mounted to rock, fluid controlled means for opposing the movement of the rocking member, and common means for controlling the fluid controlled means and the axial movement of the sleeve carrying the rocking bearing.

9. A power transmission mechanism comprising a driving member, a driven member, a friction clutch member secured to the driven member, two clutching members between which the clutch member on the driven member operates both of said members being mounted to turn with the driving member, a rocking bearing for one of said last named members, movable in the direction of the axis of turning of the driven member, and fluid controlled means opposing the rocking movement of said rocking member.

10. A power transmission mechanism comprising a driving member, a driven member, a friction clutch member secured to the driven member, two clutching members between which the clutch member on the driven member operates, both of said members being mounted to turn with the driving member, a rocking bearing for one of said last named members, movable in the direction of the axis of turning of the driven member, and fluid controlled means opposing the rocking movement of said rocking member and common means for controlling the axial movement of the rocking bearing and the fluid controlled means.

LEON G. SIMPSON.